Figure 1:
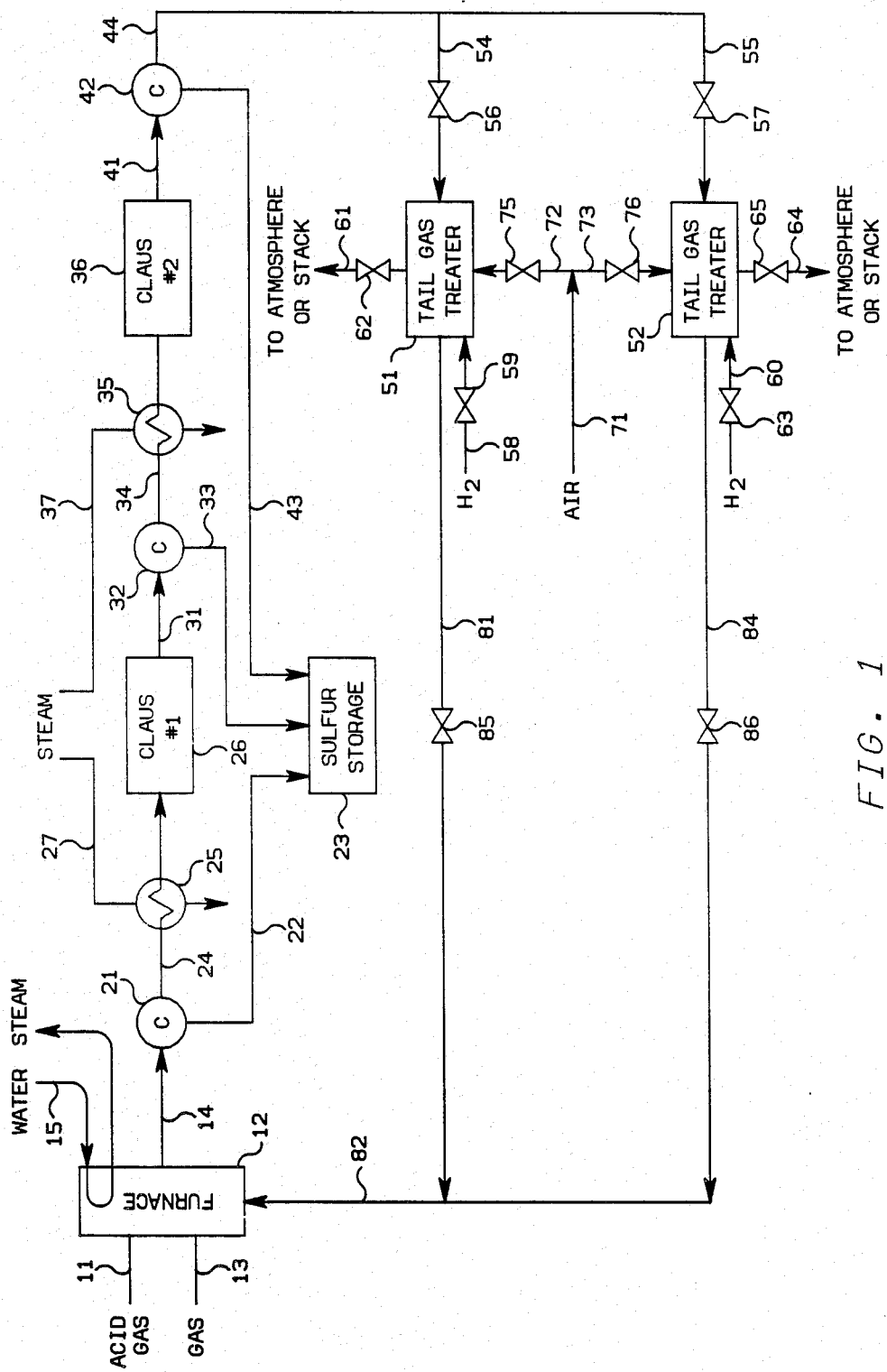

United States Patent [19]
Farha, Jr.

[11] Patent Number: 4,636,371

[45] Date of Patent: Jan. 13, 1987

[54] REMOVAL OF SULFUR OXIDES FROM FLUID STREAMS

[75] Inventor: Floyd E. Farha, Jr., Bartlesville, Okla.

[73] Assignee: Phillips Petroleum Company, Bartlesville, Okla.

[21] Appl. No.: 773,964

[22] Filed: Sep. 9, 1985

[51] Int. Cl.$^4$ .................... B01J 8/00; C01B 17/00; C01B 17/16; C01B 17/02

[52] U.S. Cl. .................... 423/244; 423/563; 423/576

[58] Field of Search ............ 423/244 A, 244 R, 570, 423/576, 563

[56] References Cited

U.S. PATENT DOCUMENTS

| | | |
|---|---|---|
| 3,752,877 | 8/1973 | Beavon ............... 423/244 A |
| 3,764,665 | 10/1973 | Groenendaal et al. ............. 423/570 |
| 3,966,879 | 1/1976 | Groenendaal et al. ......... 423/244 R |
| 3,985,861 | 10/1976 | Hudson, Jr. ..................... 423/244 |
| 4,044,114 | 8/1977 | Dezael et al. .................... 423/576 |
| 4,187,282 | 2/1980 | Matsuda et al. ................... 423/244 |
| 4,313,820 | 2/1982 | Farha, Jr. et al. ................ 423/244 |
| 4,371,507 | 2/1983 | Farha, Jr. et al. ................ 423/244 |
| 4,533,529 | 8/1985 | Lee .................................. 423/563 |

Primary Examiner—Gary P. Straub
Attorney, Agent, or Firm—French and Doescher

[57] ABSTRACT

The removal of sulfur oxide (particularly sulfur dioxide) from a fluid stream, such as the tail gas from a sulfur process, is accomplished by contacting such fluid stream with a catalyst composition comprising zinc titanate and a promoter in the presence of a hydrogen donor.

17 Claims, 2 Drawing Figures

REMOVAL OF SULFUR OXIDES FROM FLUID STREAMS

This invention relates to a process for the removal of sulfur oxides from fluid streams. In one aspect, this invention relates to a process for treating the tail gas from a sulfur process so as to meet environmental standards and also provide hydrogen sulfide for recycle to the sulfur process.

The present invention is particularly applicable to the treatment of the tailgas from a sulfur process and will be described in terms of such a process. However, the process for removing sulfur oxides in accordance with the present invention is applicable to the treatment of any fluid stream which contains an undesired concentration of sulfur oxide.

The present invention is also particularly applicable to the removal of sulfur dioxide and will be described in terms of such a removal. However, the invention is also believed to be applicable to the removal of other oxides of sulfur.

The recovery of free sulfur from gaseous streams containing hydrogen sulfide has become a valuable procedure in the petroleum refining industries. Such an operation results in both the recovery of valuable free sulfur and a reduction of atmospheric pollution. The free sulfur generally is produced by a process which involves the following two reactions:

$$2H_2S + 3O_2 \rightleftarrows 2H_2O + 2SO_2 \quad \text{(I)}$$

$$2H_2S + SO_2 \rightleftarrows 3S + 2H_2O. \quad \text{(II)}$$

The first reaction generally takes place in the combustion chamber of a boiler. Since this reaction is highly exothermic, the substantial amount of heat which is liberated is recovered in the form of steam production. One third of the source hydrogen sulfide is combined with air to form sulfur dioxide in this reaction. The remainder of the hydrogen sulfide is combined with the reaction products from the combustion chamber to carry out the second reaction in the furnace. The effluent from the furnace is cooled, and the free sulfur product is recovered as a liquid.

All the hydrogen sulfide and sulfur dioxide gases will not be converted in the furnace. The remaining unconverted gases are usually passed through two or three catalytic sulfur reactors to further convert the unreacted hydrogen sulfide and sulfur dioxide to free sulfur. The effluent from the reactors is cooled, and the free sulfur product is removed as a liquid.

The noncondensed material from the final catalytic sulfur reactor is usually simply passed to an incinerator. In the past, the noncondensed material (tail gas) from the sulfur process was charged into a heated firebox in an incinerator. The firebox is heated by passing hot combustion gases from a burner through the firebox. In general the incinerator stack must be maintained at a temperature of at least approximately 1200° F. to obtain satisfactory hydrogen sulfide to sulfur dioxide conversion to meet environmental considerations. Maintaining the incinerator stack at 1200° F. requires a large fuel gas consumption and adds considerable cost to the sulfur process.

It would be desirable to be able to avoid the cost involved in incineration of the tail gas. However, it would be necessary to remove $SO_2$ and $H_2S$ almost completely from the tail gas in order to avoid such incineration.

It is thus an object of this invention to provide a process for removing $SO_2$ from a fluid stream such as the tail gas from a sulfur process. Hydrogen sulfide is also removed in accordance with the process of the present invention. Other suitable fluid streams may also be treated if desired.

In accordance with the present invention, a method is provided whereby a fluid stream containing $SO_2$, such as the tail gas from a sulfur proceess, is contacted with a catalyst composition comprising zinc titanate and a promoter in the presence of a hydrogen donor. The promoter is at least one member selected from the group consisting of vanadium, chromium, cobalt, nickel, tungsten, rhenium, platinum, palladium, rhodium, ruthenium, and compounds thereof. Sulfur dioxide is converted to hydrogen sulfide during such contacting and such converted hydrogen sulfide as well as hydrogen sulfide contained in the fluid stream are reacted with the catalyst composition and are removed from the fluid stream.

The removal of sulfur dioxide is preferably carried out in cycles comprising a reaction period and a regeneration period for the catalyst. The reaction period comprises contacting the fluid stream containing sulfur dioxide with the catalyst in the presence of a hydrogen donor to thereby convert the sulfur dioxide to hydrogen sulfide. Such hydrogen sulfide and any hydrogen sulfide contained in the original fluid stream are also reacted with the catalyst composition during the reaction period. After the reaction period, a gas containing molecular oxygen is passed in contact with the catalyst composition to regenerate the original catalyst composition and convert the reacted hydrogen sulfide to an oxide form (predominantly $SO_2$). In the case of a sulfur process, such $SO_2$ can be conveniently recycled.

Figure 2:
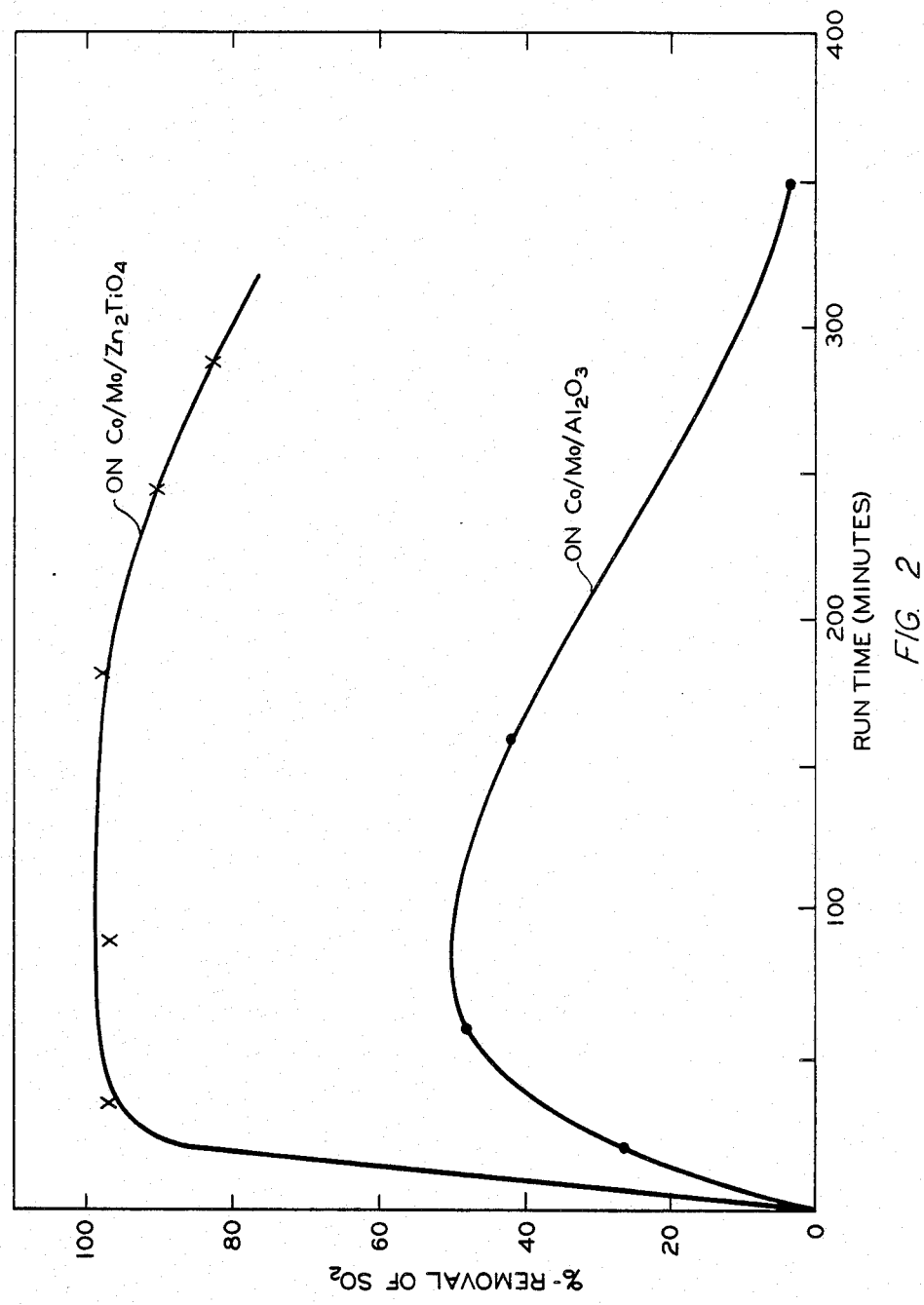

Additional objects and advantages of the invention will be apparent from the foregoing brief description of the invention and the claims as well as the detailed description of the drawings and the sulfur dioxide removal process. The drawings are briefly described as follows:

FIG. 1 is a diagrammatic illustration of a Claus sulfur plant incorporating the present invention; and FIG. 2 is a graphical illustration of the benefits of the present invention.

For the sake of simplicity, the invention is illustrated and described in terms of a sulfur plant wherein the catalytic sulfur converters are Claus converters. Although the invention is illustrated and described in terms of a specific embodiment, the applicability of the use of the invention described herein extends to sulfur plants using different types of catalytic sulfur converters. Also, as previously stated, the invention extends to the removal of sulfur dioxide from any fluid stream which contains an undesirable concentration of sulfur dioxide.

Referring now to the drawings and in particular to FIG. 1, an acid-gas feed stream containing $H_2S$ passes through conduit 11 into the reaction furnace 12. The reaction furnace 12 is also supplied with air via supply conduit 13. Sufficient air is mixed with the acid-gas feed in the furnace to convert one-third of the $H_2S$ fed to the furnace to $SO_2$ and also burn any hydrocarbons present in the acid-gas feed. The well known stoichiometric reaction in the furnace is $$2H_2S + 2 \rightleftharpoons 2H_2O + 2SO_2 \quad \text{(I)}$$

$$2H_2S \rightleftharpoons SO_2 \rightleftharpoons 3S + 2H_2O. \quad \text{(II)}$$

Burning of one-third of the $H_2S$ to $SO_2$ yields a desired $H_2S/SO_2$ mol ratio of 2.0 in the reaction effluent gas which leaves the reaction furnace 12 via conduit means 14. It is noted that it may be necessary to adjust the amount of air supplied to the furnace to maintain the desired $H_2S/SO_2$ mole ratio in view of the amount of $SO_2$ being recycled at any particular time (the recycle will be described hereinafter).

The flame temperature in the reaction furnace may reach temperatures of 2450° F. At such temperature some of the unburned $H_2S$ can react with the $SO_2$ formed by the reaction given in equation (I), to form free sulfur vapor in accordance with the reaction of equation (II). This will decrease the temperature of the hot gases to about 2300° F. Heat can be removed from the hot gases by heat exchange with water passed through the reaction furnace 12 via conduit 15. The hot gases in the reaction furnace are typically cooled to 550° F. before exiting the furnace.

The hot gases pass from the reaction furnace 12 through conduit 14 to a sulfur condenser 21. The free sulfur vapor formed in the reaction furnace 12 is condensed and the resulting liquid sulfur can then be separated from the main gas stream containing unreacted $H_2S$ and $SO_2$. The separated liquid free sulfur flows through conduit 22 to sulfur storage tank 23.

The main gas stream from the sulfur condenser 21 must be reheated before going to a sulfur converter reactor. This is necessary to prevent sulfur condensation and subsequent catalyst fouling on the converter catalyst beds. The main gas stream flows through heat exchanger means 25 via conduit 24 to a Claus catalytic converter 26. The main gas stream is heated to a desired temperature e.g., in the range of 400°–450° F., by the high pressure steam flowing through conduit 27.

The reaction proceeds to a further degree of completion in the presence of the catalyst in the catalytic converter 26. The reaction involved is $$2H_2S + SO_2 \rightleftharpoons 3S + 2H_2O. \quad \text{(II)}$$

The main gas stream which now contains free sulfur plus the unreacted $H_2S$ and $SO_2$ flows out of the Claus catalytic converter 26 through conduit 31 to sulfur condenser 32 where the free sulfur is condensed. The condensed free sulfur flows through conduit 33 to sulfur storage tank 23.

The thus stripped main gas stream, containing the remaining unreacted $H_2S$ and $SO_2$ and a very small amount of uncondensed free sulfur, is fed through heat exchanger means 35 via conduit 34 to Claus catalytic converter 36. The unreacted $H_2S$ and $SO_2$ gases are again heated to a desired temperature, e.g. in the range of 400°–450° F., by high pressure steam which flows through conduit means 37.

More free sulfur is formed from the previously unreacted $H_2S$ and $SO_2$ in the Claus catalytic converter 36. The effluent stream containing free sulfur and the remaining unreacted $H_2S$ and $SO_2$ passes from the Claus catalytic converter 36 to sulfur condenser 42 via conduit 41. Most of the free sulfur is condensed and flows through conduit 43 to sulfur storage tank 23.

Two tail gas treaters 51 and 52, which would contain the promoted zinc titanate catalyst, are illustrated in FIG. 1. It would be possible to operate with only one tail gas treater but, for a continuous process, it is desirable to employ two tail gas treaters so that one tail gas treater can be placed on regeneration while the other tail gas treater is being utilized to treat tail gas.

The Claus tail gas, containing the remaining unreacted $H_2S$ and $SO_2$, flows through the combination of conduit 44 and 54 to the tail gas treater 51 and through the combination of conduit 44 and 55 to the tail gas treater 52. The one of the tail gas treaters 51 and 52 to which the tail gas is provided is determined by the position of control valves 56 and 57 respectively.

Treated tail gas is removed from the tail gas treater 51 through conduit 61 in which control valve 62 is operably located. In like manner, tail gas from the tail gas treater 52 is removed through conduit 64 in which control valve 65 is operably located. In some cases, the tail gas may be vented directly to the atmosphere. In other cases it may be necessary to supply the tail gas to a stack or combust the tail gas but the extreme combustion conditions necessary to remove $SO_2$ and $H_2S$ will not be required.

The hydrogen donor required for the reaction is provided to tail gas treater 51 through conduit 58 in which control valve 59 is operably located. In like manner, the hydrogen donor is provided to tail gas treater 52 through conduit 60 in which control valve 63 is operably located.

The hydrogen donor is preferably hydrogen gas. However, any suitable hydrogen donor may be used. Other suitable hydrogen donors include light paraffins such as methane, ethane, propane and butane.

Air for regeneration is provided through the combination of conduit 71 and 72 to the tail gas treater 51 and through the combination of conduit 71 and 73 to the tail gas treater 52. The one of the tail gas treaters to which the air will be supplied will be determined by the position of control valves 75 and 76 respectively.

During regeneration, $SO_2$ is supplied from the tail gas treater 51 through the combination of conduits 81 and 82 to the furnace 12. In like manner, $SO_2$ is supplied from the tail gas treater 52 through the combination of conduits 84 and 82 to the furnace 12. The position of control valves 85 and 86 determine the flow through conduits 81 and 84 respectively.

In operation, assuming the tail gas treater 51 is to be used to treat tail gas, control valves 56, 59 and 62 would be open and control valves 75 and 85 would be closed. Control valves 57, 63 and 65 would be closed. Also, if the tail gas treater 52 is being regenerated, control valves 76 and 86 would be opened. This arrangement of control valves would be switched when it is desired to treat tail gas in the tail gas treater 52 and regenerate the catalyst in the tail gas treater 51.

The catalyst employed in the tail gas treater 51 and the tail gas treater 52 is a composition comprising zinc titanate and a promoter. At least one member of the promoter is selected from the group consisting of vanadium, chromium, cobalt, nickel, molybdenum tungsten, rhenium, platinum, palladium, rhodium, ruthenium, and compounds thereof. The promoting elements are generally present on the catalyst as the oxide or the sulfide except for platinum which will generally be present as the element.

The zinc titanate base of the catalyst composition may be prepared by intimately mixing suitable portions of zinc oxide and titanium dioxide, preferably in a liquid such as water, and calcining the resulting mixture in a gas containing molecular oxygen at a temperature in the range of about 650° C. to about 1050° C., preferably in the range of about 675° C. to about 975° C. A calcining temperature in the range of about 800° C. to about 850° C. is most preferred because the surface area of the catalyst is maximized in this temperature range thus producing a more active catalyst. The titanium dioxide used in preparing the zinc titanate preferably has extremely fine particle size to promote intimate mixing of the zinc oxide and titanium dioxide. This produces a rapid reaction of the zinc oxide and titanium dioxide which results in a more active catalyst. Preferably the titanium dioxide has an average particle size of less than 100 millimicrons and more preferably less than 30 millimicrons. Flame hydrolyzed titanium dioxide has extremely small particle size and is particularly preferred in preparing the catalyst. The atomic ratio of zinc to titanium can be any suitable ratio. The atomic ratio of zinc to titanium will generally lie in the range of about 1:1 to about 3:1 and will preferably lie in the range of about 1.8:1 to about 2.2:1 because the activity of the catalyst is greatest for atomic ratios of zinc to titanium in this range. The term "zinc titanate" is used regardless of the atomic ratio of zinc to titanium.

The zinc titanate base of the catalyst composition may also be prepared by coprecipitation from aqueous solutions of a zinc compound and a titanium compound. The aqueous solutions are mixed together and the hydroxides are precipitated by the addition of an alkali metal hydroxide. The precipitate is then washed, dried and calcined, as described in the preceding paragraph, to form zinc titanate. This method of preparation is less preferred than the mixing method because the zinc titanate prepared by the coprecipitation method is softer than the zinc titanate prepared by the mixing method.

The promoter, at least one member of which is selected from the group consisting of vanadium, chromium, cobalt, nickel, molybdenum, tungsten, rhenium, platinum, palladium, rhodium, ruthenium and compounds thereof, is generally present on the catalyst in the oxide or sulfide form except for platinum which will generally be present in the elemental form. The promoter can be added to the zinc titanate by any method known in the art. The promoter can be added to the zinc titanate as powdered oxide and dispersed by any method known in the art such as rolling, shaking or stirring. For ease of preparation, the preferred method of adding the promoter is by impregnating the preformed zinc titanate with a solution of a compound of the promoting element that becomes converted to the oxide during the subsequent preparation of the catalyst. The impregnated catalyst is dried to remove solvent and is then heated in air at a temperature in the range of about 500° C. to about 650° C., preferably about 540° C. If more than one of the promoting elements is to be used in the catalyst composition, the catalyst composition is preferably dried and calcined after each addition of a promoting element.

The concentration of the promoter can be any suitable concentration. The concentration of the total promoter, expressed as an element, will generally be in the range of from about 0.1 to about 20 weight percent based on the weight of the catalyst composition. The concentration of the vanadium, chromium, cobalt, nickel, molybdenum, or tungsten as individual promoting elements, expressed as an element, if present, will preferably be in the range of about 0.1 to about 18 weight percent based on the weight of the catalyst composition and will more preferably be in the range of about 1.6 to about 8 weight percent. The concentration of rhenium, palladium, rhodium, ruthenium or platinum as individual promoting elements, expressed as the element, if present, will preferably be in the range of about 0.1 to about 1.6 weight percent.

Either the elemental form of the promoters or any suitable compound of the promoters may be used to form the catalyst composition.

Vanadium compounds suitable for use as a promoter include di-, tri-, tetra-, and pentavalent vanadium oxides, vanadium (III) sulfide, vanadium (IV) oxide sulfate, ammonium metavanadate, sodium metavanadate, and the like and mixtures of any two or more thereof.

Chromium compounds suitable for use as a promoter include ammonium chromate and ammonium dichromate, chromic nitrate, chromium (III) oxide, chromium (VI) oxide, chromic sulfate, potassium chromate and potassium dichromate, chromic acetate, and the like and mixtures of any two or more thereof.

Cobalt compounds suitable for use as a promoter include cobalt acetate, cobalt carbonate, cobalt nitrate, cobalt oxide, cobalt sulfate, ammonium cobalt sulfate, cobalt sulfamate, and the like and mixtures of any two or more thereof.

Nickel compounds suitable for use as a promoter include nickel acetate, nickel carbonate, nickel nitrate, nickel oxide, nickel sulfate, ammonium nickel sulfate, nickel sulfamate, and the like and mixtures of any two or more thereof.

Molybdenum compounds suitable for use as a promoter include ammonium molybdate, potassium molybdate, molybdenum oxides such as molybdenum (IV) oxide and molybdenum (VI) oxide, molybdenum sulfide, and the like and mixtures of any two or more thereof.

Tungsten compounds suitable for use as a promoter include ammonium tungstates such as ammonium metatungstate and ammonium paratungstate, tungsten oxides such as tungsten (IV) oxide and tungsten (VI) oxide, tungsten sulfides such as tungsten (IV) sulfide and tungsten (VI) sulfide, heteropoly acids such as tungstophosphoric acid and tungstosilicic acid, and the like and mixtures of any two or more thereof.

Rhenium compounds suitable for use as a promoter include perrhenic acid, ammonium perrhenate, rhenium oxides such as rhenium (VI) oxide and rhenium (VII) oxide, rhenium sulfide, and the like and mixtures of any two or more thereof.

Platinum compounds suitable for use as a promoter include dihydrogen hexachloroplatinate, diamineplatinum (II) nitrate, tetraamineplatinum (II) nitrate, and the like and mixtures of any two or more thereof.

Ruthenium, rhodium, and palladium nitrates are a suitable form for the addition of these elements as catalyst promoters.

Halogen-containing compounds of the promoting elements can be used as promoters. However, the user should be aware of the possibility of corrosion caused by their presence.

A combination of cobalt and molybdenum is presently the most preferred promoter because of the improved selectivity of a catalyst composition employing this promoter. Especially preferred are catalyst compositions in which the cobalt:molybdenum atomic ratio is in the range of about 0.6 to about 0.8.

The chemical changes that are believed to occur in the tail gas treaters during the cyclic process where sulfur dioxide is present are summarized in the following equations:

$$Zn_2TiO_4 + 2SO_2 + 6H_2 \rightleftharpoons 2ZnS + TiO_2 + 6H_2O \quad (III)$$

$$Zn_2TiO_4 + 2H_2S \rightleftharpoons 2ZnS + TiO_2 + 2H_2O \quad (IV)$$

$$ZnS + Oxygen \rightleftharpoons ZnO + SO_x \quad (V)$$

$$2ZnO + TiO_2 \rightleftharpoons Zn_2TiO_4 \quad (VI)$$

The reactions of equations (III) and (IV) occur during the reaction step. The reactions of equations (V) and (VI) occur during the regeneration step.

Any suitable temperature for treatment of the tail gas over the catalyst composition of the present invention can be utilized. The temperature will generally be in a range of about 200° C. to about 550° C. and will more preferably be in the range of about 300° C. to about 450° C.

Any suitable pressure for the treatment of the tail gas over the catalyst composition of the present invention can be utilized. In general, the pressure will be in the range of about 0 to about 3000 psig total system pressure. The total system pressure is the sum of the partial pressure of the feedstock plus the partial pressure of the added hydrogen. Preferably the total system pressure will range from about 5 to about 500 psig.

Any suitable quantity of hydrogen can be added to the process. Generally, the mole ratio of hydrogen gas added to sulfur dioxide present in the tail gas will be in the range from about 3:1 to about 200:1, more preferably from about 10:1 to about 100:1.

Any suitable residence time for the tail gas in the presence of the catalyst composition of the present invention can be utilized. In general, the residence time in terms of the volumes of tail gas per volume of catalyst per hour (GHSV) can range from about 10 to about 5000 and will more preferably range from about 1000 to about 3000.

The catalyst composition used in the tail gas treaters 51 and 52 will continue to be effective for converting sulfur dioxide to hydrogen sulfide even when completely sulfided. However, when the catalyst composition is completely sulfided, it will no longer combine with the hydrogen sulfide in the manner set forth in equation (IV). When this condition occurs, hydrogen sulfide will begin to appear in the effluent flowing from the tail gas treaters through conduits 61 and 64 respectively. This will be an indication that the catalyst composition should preferably be regenerated. The time required for the catalyst composition to become completely sulfided will generally be a function of the concentration of sulfur in the feed to the tail gas treaters and the feed rate employed.

Before the catalyst composition becomes completely sulfided, the catalyst composition is typically regenerated by terminating the flow of tail gas to the tail gas treaters and purging with an inert fluid such as nitrogen to remove any combustibles. A free oxygen-containing fluid such as the air illustrated in FIG. 1 is then introduced to oxidize the zinc sulfide in accordance with equation (V). Also, at the temperature at which the oxidation of zinc sulfide is affected, the zinc oxide thus produced recombines with the titanium dioxide to re-synthesize the original zinc titanate in accordance with equation (VI).

The amount of oxygen, from any source, supplied during the regeneration step will generally be in an amount sufficient to at least substantially remove sulfur from the catalyst composition. The regeneration step is conducted at generally about atmospheric pressure. The temperature for the regeneration step is preferably maintained in the range of about 370° to about 815° C. and is more preferably maintained at about 540° C. in order to both oxidize the zinc sulfide and convert the zinc oxide and titanium dioxide to zinc titanate within a reasonable time.

The following examples are presented in further illustration of the invention.

EXAMPLE I

In this example the experimental procedure for the removal of $SO_2$ from gas streams by means of various solid catalyst materials is described.

Tests were carried out in a single reactor unit at about 9 psig. A ¾" O. D. stainless steel reactor was used, and the reactor was operated in a fixed bed down flow mode using 20 cc of sorbent. The sorbent was heated to the reaction temperature in a stream of nitrogen. When the desired temperature was attained, the nitrogen flow was stopped and the simulated Claus tail gas and water vapor flows were started. The water vapor was generated by pumping water through a heated line that was connected to the top of the reactor. The composition of the simulated Claus tail gas was controlled by mixing three feed gases. The compositions of the feed gases were as follows: (a) $H_2S$ blend: 1.03 volume-% $H_2S$, 0.135 volume-% $CS_2$, 0.139 volume-% COS, balance $N_2$; (b) $SO_2$ blend: 1.22 volume-% $SO_2$, 2.93 volume-% CO, balance $N_2$; and (c) $H_2$.

The progress of the absorption was followed by measuring the $SO_2$ and $H_2S$ concentrations in the reactor effluent after the water vapor had been condensed and removed from the effluent. The concentrations were measured with Draeger tubes suited to the concentration ranges encountered.

Three catalyst materials were employed: (1) quartz chips; (2) $Co/Mo/Al_2O_3$ with 3.2 weight-% Co and 7.8 weight-% Mo (marketed as Ketjen K-124-LD by Armak Catalyst Division of Akzona, Inc., Pasadena, TX); and (3) $Co/Mo/Zn_2TiO_4$ with 3.1 weight-% Co (as CoO) and 8.3 weight-% Mo (as $MoO_3$).

The $Co/Mo/Zn_2TiO_4$ catalyst was prepared as follows. $Zn_2TiO_4$ was prepared essentially in accordance with the procedure described in the example of U.S. Pat. No. 4,376,689, column 7, lines 20–31. A solution of 306 grams of $(NH_4)_6Mo_7O_{24}\cdot 4H_2O$ (lot KHLZ; Mallinckrodt, Inc.; St. Louis, MO) in 2.0 liters of distilled water was added to 500.5 grams of $Zn_2TiO_4$ with stirring. After 2 hours of intermittent stirring, the supernatant solution was decanted. The wet solid residue was dried on a hot plate for about 1 hour and then calcined at about 1000° F. for about 3 hours. To the thus heat treated Mo-impregnated $Zn_2TiO_4$ was added a solution of 272 grams of $Co(NO_3)_2\cdot 6H_2O$ (lot KHPA; Mallinckrodt, Inc.) in 2.0 liters of distilled water. After about 2 hours of intermittent stirring, the supernatant solution was decanted. The wet, solid residue was dried on a hot plate for about 1 hour and then calcined at about 1000° F. for about 3 hours.

Example II

This example illustrates the removal of $SO_2$ from a simulated Claus tail gas comprising 4800 ppm $H_2S$, 2850 ppm $SO_2$, 65 ppm COS, about 65 ppm $CS_2$, 1.37 weight-% CO, 3.0 weight percent $H_2$, 30.0 weight-% $H_2O$ vapor and 64.8 weight-% $N_2$. This gas mixture was passed through the catalyst bed described in Example I at a GHSV of about 2000 cc/cc catalyst/hr. and various temperatures. Test results are summarized in Table I.

TABLE I

| Run | Catalyst | Temp (°C.) | Run Time (min.) | PPM in Product $SO_2$ | PPM in Product $H_2S$ | Removal of $SO_2$ (%) |
|---|---|---|---|---|---|---|
| 1 (Control) | Quartz Chips | 315 | 50 | 2,380 | 4,215 | 16 |
| | | | 90 | 2,590 | 4,150 | 9 |
| 2 (Control) | Co/Mo/$Al_2O_3$[1] | 282 | 25 | 1,412 | 1,017 | 50 |
| | | | 75 | 1,822 | 1,956 | 36 |
| | | | 150 | 2,825 | 2,690 | 1 |
| 3 (Control) | Co/Mo/$Al_2O_3$ | 399 | 20 | 2,118 | 748 | 26 |
| | | | 60 | 1,473 | 1,082 | 48 |
| | | | 160 | 1,646 | 1,695 | 42 |
| | | | 350 | 2,778 | 2,922 | 3 |
| 4 (Invention) | Co/Mo/$Zn_2TiO_4$[2] | 357 | 35 | 78 | 5 | 97 |
| | | | 180 | — | 3,279 | — |
| | | | 195 | 982 | — | 66 |
| 5 (Invention) | Co/Mo/$Zn_2TiO_4$ | 391 | 37 | 90 | 110 | 97 |
| | | | 92 | 85 | 68 | 97 |
| | | | 182 | 90 | 180 | 97 |
| | | | 245 | 280 | 480 | 90 |
| | | | 287 | 500 | 750 | 82 |

[1]Surface area (BET/$N_2$): 282 $m^2/g$
[2]Surface area (BET/$N_2$): 10 $m^2/g$ Data in Table I show that Co/Mo-promoted zinc titanate was considerably more effective in removing $SO_2$ from the gas mixture (containing also $H_2S$ and water vapor) than Co/Mo-promoted alumina (compare especially runs 3 and 5 which were carried out at substantially the same temperature). This result is even more surprising in view of the fact that the surface area of the promoted zinc titanate was much lower than that of the promoted alumina. Data of runs 3 and 5 (both at 390°–400° C.) are plotted in FIG. 2 to even more clearly demonstrate the significantly different performance of the two catalyst materials.

Based on the results using zinc titanate promoted with cobalt and molybdenum and based on extensive experience with zinc titanate, it is believed that the other listed promoters would also be effective.

Reasonable variations and modifications are possible within the scope of the disclosure and the appended claims to the invention. Again, one variation is the treatment of fluid streams other than a tail gas from a sulfur process.

That which is claimed is:

1. A process for removing a sulfur oxide from a gaseous stream containing a sulfur oxide comprising the step of contacting said gaseous stream in the presence of a hydrogen donor with a catalyst composition comprising zinc titanate and at least one promoter selected from the group consisting of vanadium, chromium, cobalt, nickel, molybdenum, tungsten, rhenium, platinum, palladium, rhodium, ruthenium and compounds thereof, wherein said sulfur oxide is converted to hydrogen sulfide and said hydrogen sulfide is absorbed by said catalyst composition.

2. A process in accordance with claim 1 wherein said sulfur oxide is sulfur dioxide, and said hydrogen donor is hydrogen gas, 3. A process in accordance with claim 1 wherein said gaseous stream is the tail gas from a sulfur manufacturing process.

4. A process in accordance with claim 1 wherein said zinc titanate in said catalyst composition is prepared by calcining a mixture of zinc oxide and titanium dioxide in the presence of molecular oxygen at a temperature in the range of about 650° C. to about 1050° C. to form said zinc titanate.

5. A process in accordance with claim 1 wherein the atomic ratio of zinc to titanium in said catalyst composition is in the range of about 1:1 to about 3:1.

6. A process in accordance with claim 1 wherein the atomic ratio of zinc to titanium in said catalyst composition is in the range of about 1.8:1 to about 2.2:1.

7. A process in accordance with claim 1 wherein said catalyst composition is calcined in the presence of molecular oxygen at a temperature in the range of about 500° C. to about 650° C. after said at least one promoter has been added to said zinc titanate.

8. A process in accordance with claim 1 wherein the concentration of each of vanadium, chromium, cobalt, nickel, molybdenum, or tungsten when present as promoters, expressed as an element, is in the range of about 0.1 to about 18 weight percent based on the weight of said catalyst composition and wherein the concentration of each of rhenium, palladium, rhodium, ruthenium or platinum when present as promoters, expressed as the element, is in the range of about 0.1 to about 1.6 weight percent based on the weight of said catalyst composition.

9. A process in accordance with claim 8 wherein the total concentration of any combination of said promoters, expressed as an element, is in the range of about 0.1 to about 20 weight percent based on the weight of the catalyst composition.

10. A process in accordance with claim 9 wherein said promoters are cobalt and molybdenum.

11. A process in accordance with claim 10 wherein the cobalt:molybdenum atomic ratio in said catalyst composition is in the range of about 0.6:1 to about 0.8:1

12. A process in accordance with claim 1 wherein the conditions at which said gaseous stream is contacted with said catalyst composition comprise a temperature in the range of about 300° C. to about 450° C., a total system pressure in the range of about 5 psig to about 500 psig and a gas hourly space velocity for said gaseous feed stream in the presence of said catalyst composition in the range of about 1000 to about 3000 volumes of said gaseous feed stream per volume of said catalyst composition per hour.

13. A process in accordance with claim 1 wherein said catalyst composition is sulfided during said process.

14. A process in accordance with claim 13 additionally comprising the steps of:
discontinuing the flow of said gaseous stream over said catalyst composition; and
contacting said catalyst composition, after the flow of said gaseous stream is discontinued, with a molecular oxygen-containing fluid under regeneration conditions to thereby regenerate said catalyst composition.

15. A process in accordance with claim 14 wherein said regeneration conditions comprise feeding a sufficient amount of said molecular oxygen-containing fluid to supply sufficient oxygen to remove substantially all of the sulfur from said catalyst composition, a temperature in the range of about 370° to about 815° C., and a pressure in the range of about atmospheric to about 1000 psig.

16. A process in accordance with claim 15 wherein sulfur is removed as an oxide during said regeneration period.

17. A process in accordance with claim 16 wherein said gaseous stream is the tail gas from a sulfur manufacturing process and wherein the sulfur removed as an oxide is recycled as a feed to said sulfur manufacturing process.

* * * * *